UNITED STATES PATENT OFFICE.

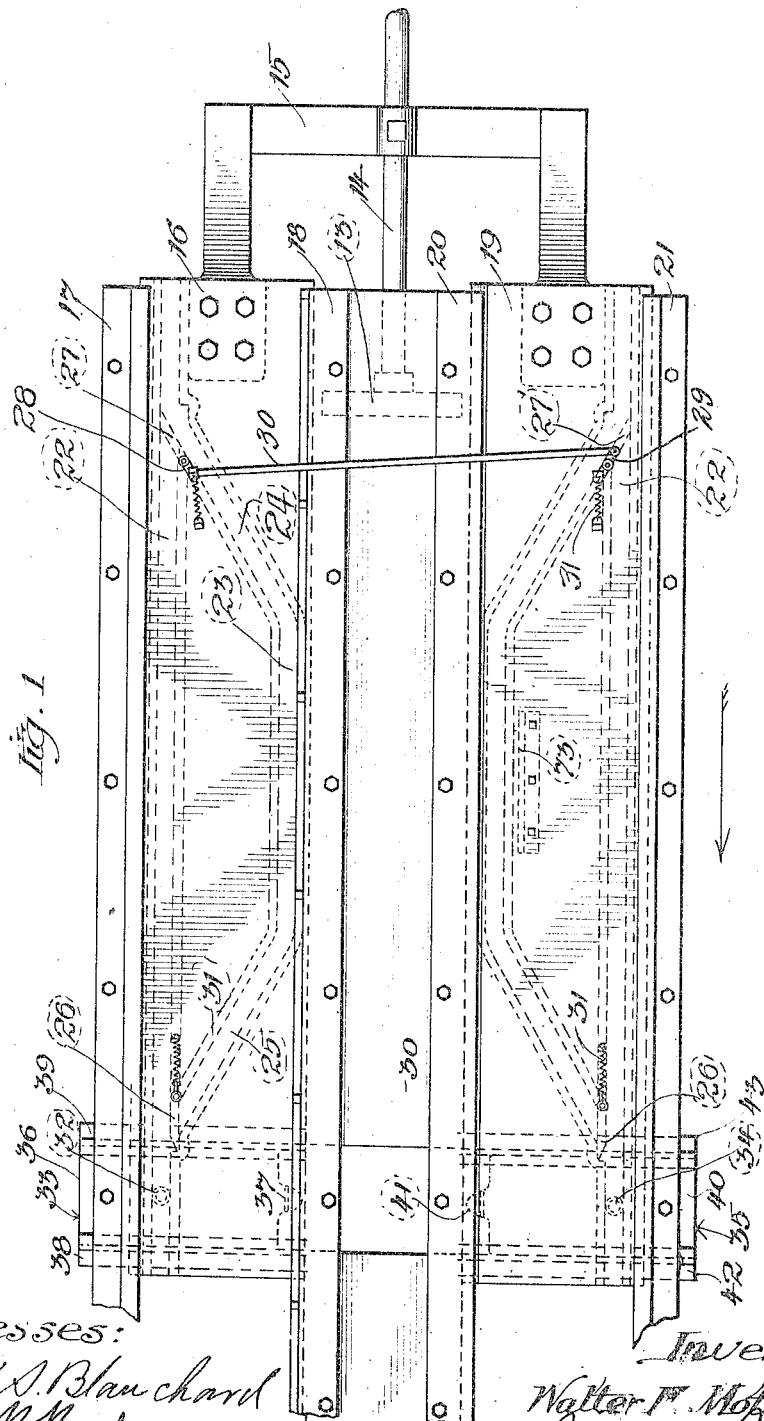

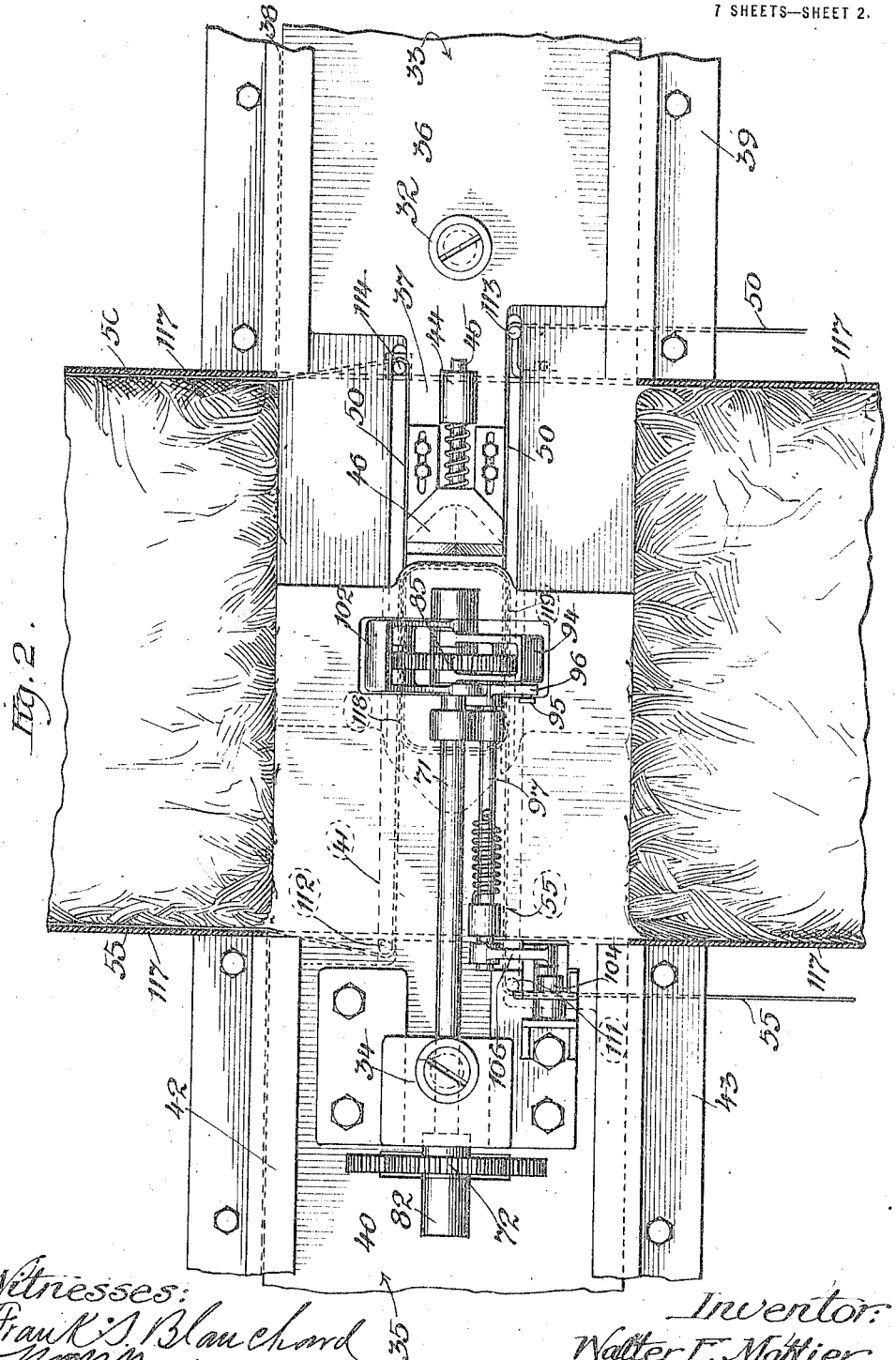

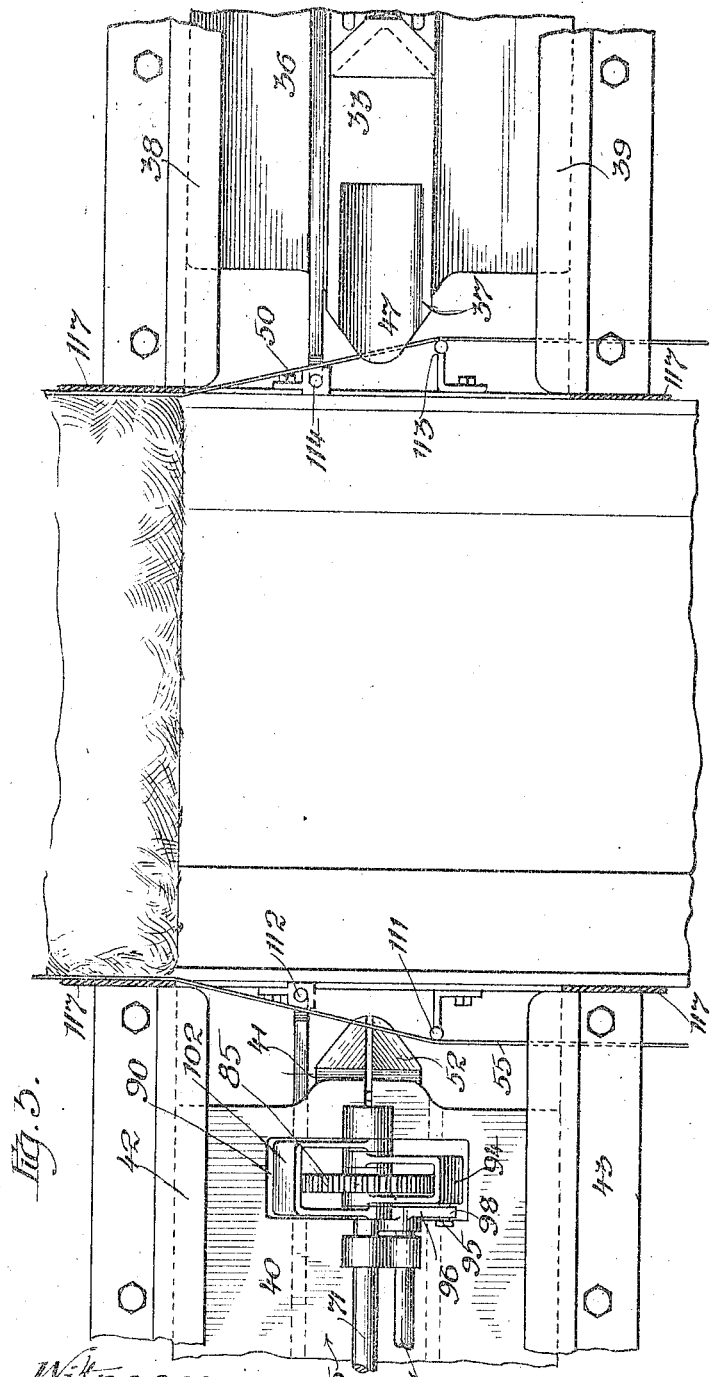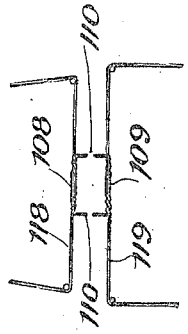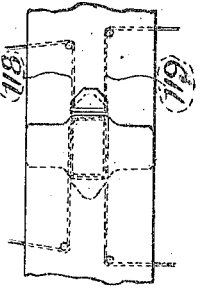

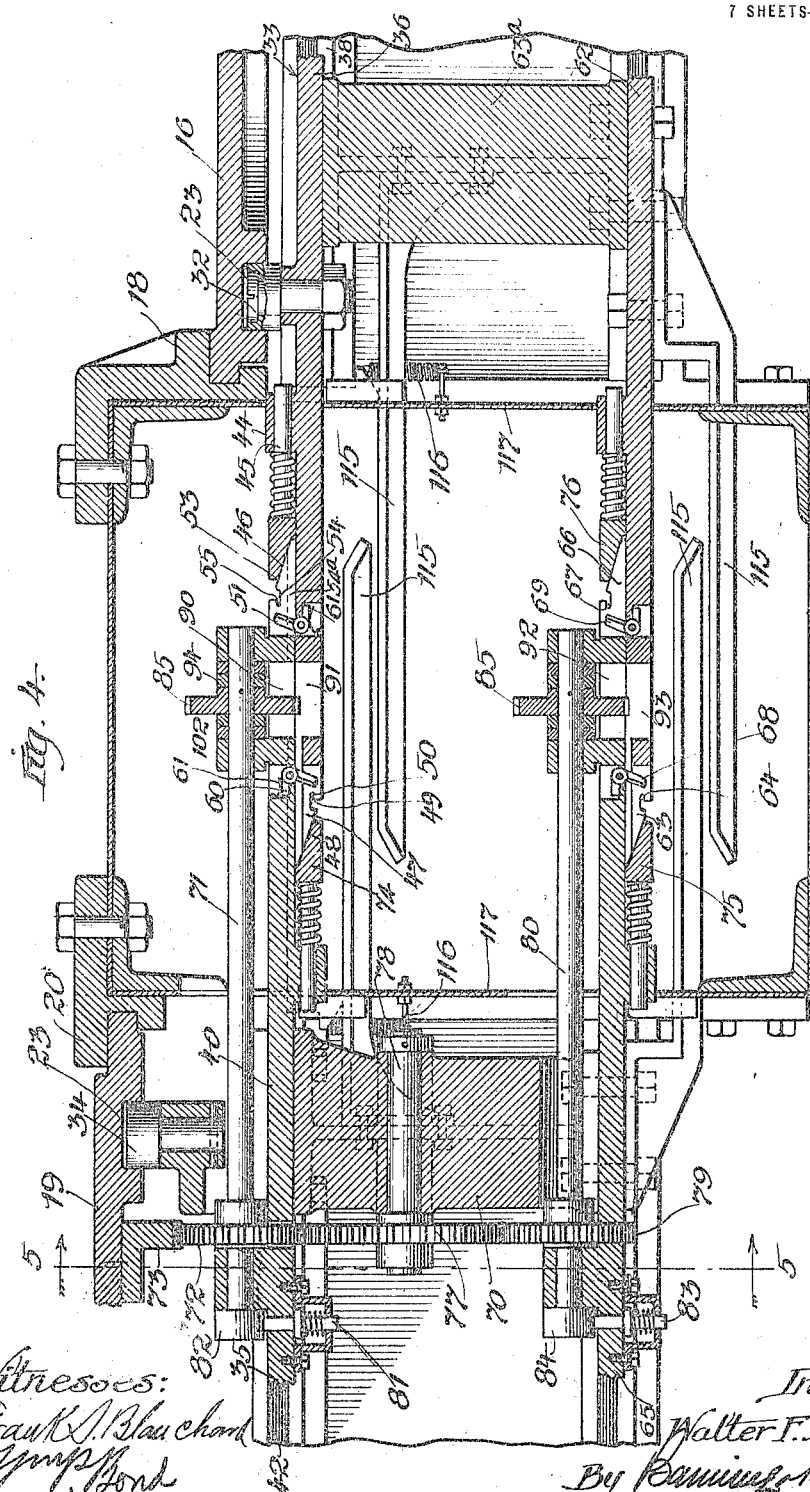

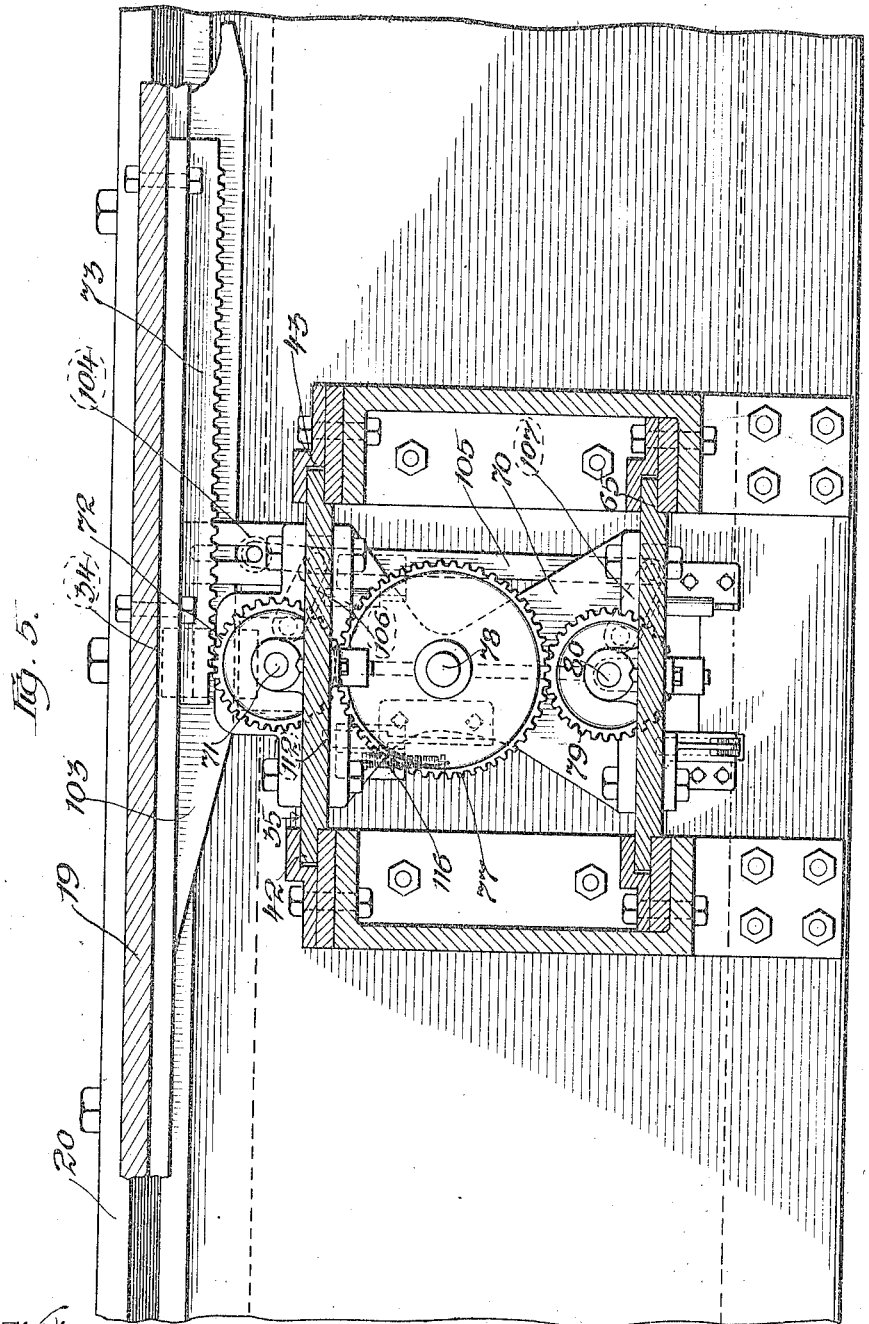

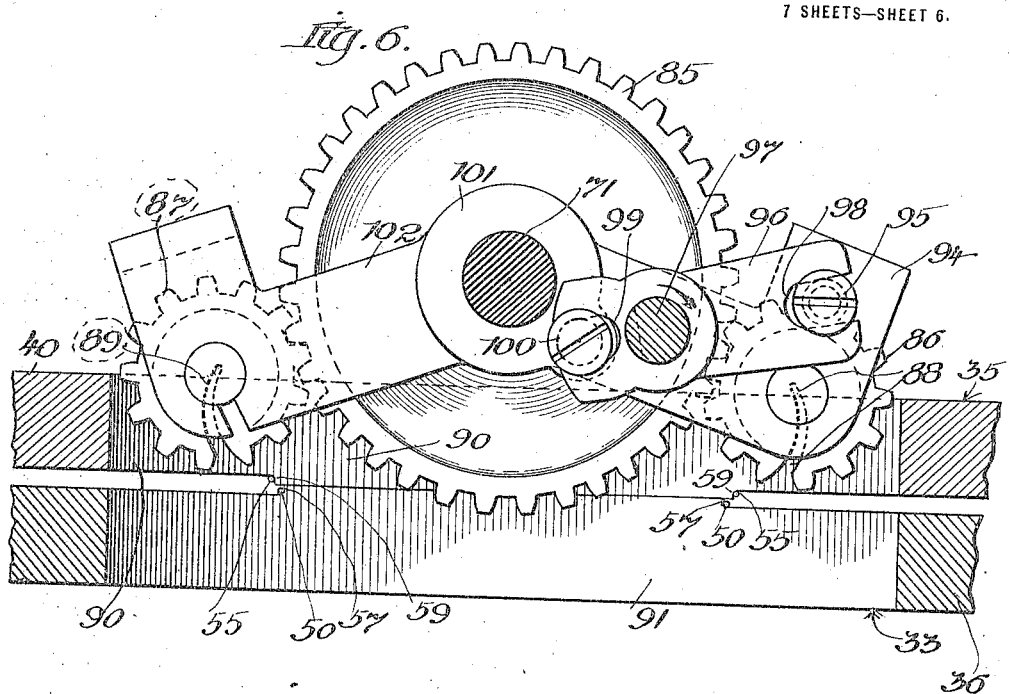
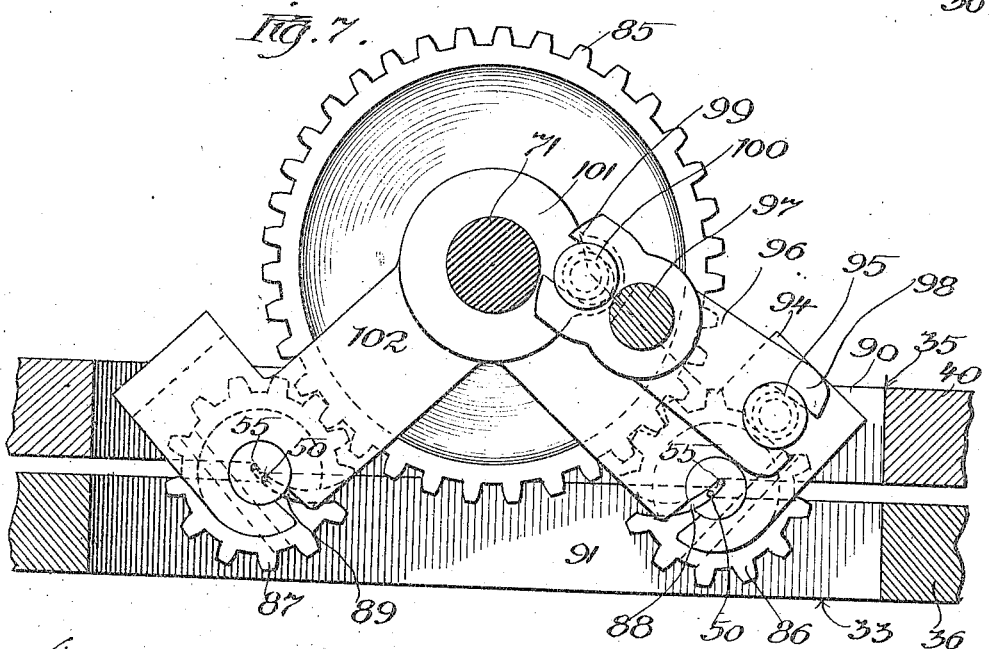

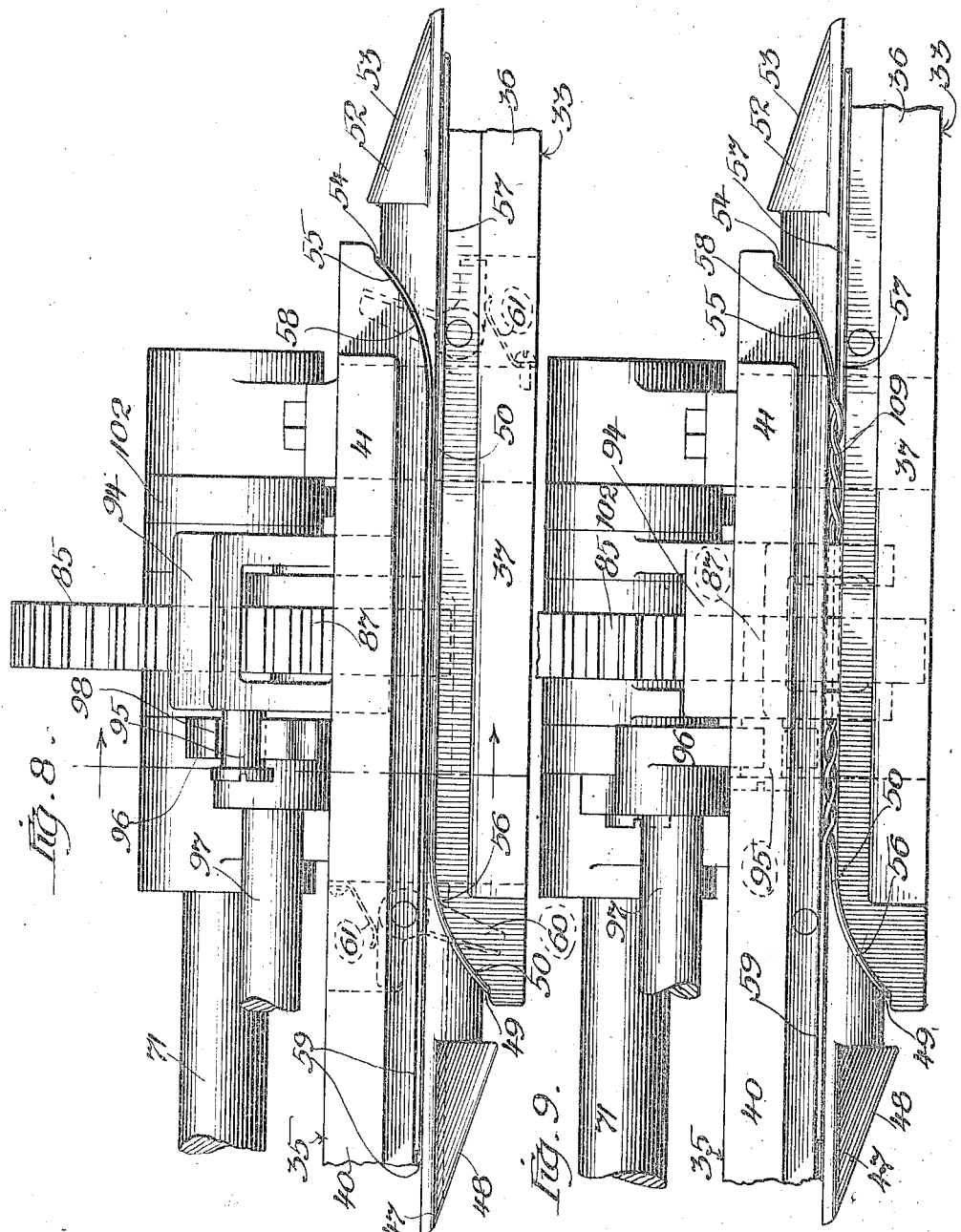

WALTER F. MOTTIER, OF GIBSON CITY, ILLINOIS.

BALE-TYING MACHINE.

1,180,934.  Specification of Letters Patent.  Patented Apr. 25, 1916.

Application filed March 3, 1915. Serial No. 11,906.

*To all whom it may concern:*

Be it known that I, WALTER F. MOTTIER, a citizen of the United States, residing at Gibson City, in the county of Ford and State of Illinois, have invented certain new and useful Improvements in Hay-Baling and Bale-Tying Machines, of which the following is a specification.

The present invention relates to a machine which operates to form the bale of hay, and to place the wire around the bale, which wire is known as the bale tie, and to fasten this wire in place.

The objects of the present invention are: to use two lengths of wire, and to force these lengths inward at periodical intervals so that each is carried forward in the shape of a loop; and to overlap these loop portions and twist the adjoining parts of the overlapping sections.

A further object of the invention is to provide means for severing the looped portions of the wire after the twisting operation, whereby the rear portion of one bale tie is formed, as well as the front portion of the next succeeding bale tie.

A further object lies in the means for twisting the adjoining sections of the overlapped wires, and in the means for actuating these twisters, both in a rotary and in a bodily movement, to carry them in and out of operative position with respect to the wires, and to time such movements to correspond with the advancement of the wire sections into overlapping position.

Another object of the invention is to actuate this wire feeding and twisting mechanism in correspondence with the advancing movement of the baling plunger, and to provide means whereby the plunger may be actuated without any actuation of the wire feeding or twisting mechanisms.

A further object of the invention is to provide guides for the wires, so that they will advance outwardly in a straight or substantially straight line, and not become separated so as to impair or interfere with the twisting thereof.

A further object is to provide buffer mechanism for arresting the movement of the sections without undue jar.

A still further object is to actuate the wire feeding, wire twisting, and wire cutting mechanisms by a single movable part.

The invention further consists in the features of construction and combinations of parts hereinafter described and claimed.

In the drawings: Figure 1 is a plan view of the mechanism of the present invention, showing by means of dotted lines the trackway for operating the wire feeding mechanism; Fig. 2 is a sectional plan view of the mechanism, showing the wire carrying mechanism and portions of two adjoining bales, this figure showing the wire carriers or shuttles in their advanced position; Fig. 3 is a sectional plan view, showing the bale of hay in position and showing the wire carrying or shuttle mechanism in retracted position; Fig. 4 is a longitudinal section through the wire carrying and twisting mechanisms; Fig. 5 is a section on line 5—5 of Fig. 4 looking in the direction of the arrow; Fig. 6 is a detail, showing the wire twisting mechanism in raised or inoperative position; Fig. 7 is a detail, showing the twister mechanism in lowered or operative position; Fig. 8 is a side elevation of the wire carrying and twisting mechanism prior to the twisting operation; Fig. 9 is a view similar to Fig. 8, showing the wire twisted. Fig. 10 is a diagrammatic view, showing the wire carrying means in withdrawn position; Fig. 11 is a diagrammatic view, showing the wire carrying means in advanced position; and Fig. 12 is a diagrammatic view, showing the twisted wires after the loop portions thereof have been severed.

The machine of the present invention, as stated, relates to mechanism for placing a bale tie around a bale, and for knotting or securing the ends of the wire so placed, and to carry on this bale tying operation in conjunction and in correspondence with the baling of the hay. In the machine illustrated, there is an upper and a lower bale tie simultaneously provided.

Referring now to the drawings, and particularly to Fig. 1, the invention is shown in conjunction with a hay baler, comprising a plunger 13 which is actuated with a reciprocating movement within a way into which the hay is forced, and the plunger is actuated from any suitable source of power. The means of actuation and construction of the baling mechanism is immaterial, and forms no part of the subject matter of the present invention, except that the bale tying mechanism and bale pressing mechanism are operated in unison and in synchronism with one another.

Secured to a rod 14 extending from the plunger 13 is a frame or bracket 15, which is attached at one end to a sliding plate 16 traveling in guideways 17 and 18, and at its opposite end to a sliding plate 19 traveling in guideways 20 and 21. Each of the plates 16 and 19 is formed on its inner face with a similar trackway, comprising a straight outer groove 22, a straight inner groove 23, and diagonal grooves 24 and 25 connecting the inner with the outer grooves. A spring-pressed gate 26 is located at the point of juncture of the groove 24 with the groove 22, and it is understood that the arrangement of the grooves is similar in each of the plates 16 and 19, and that each is provided with one of the gates 26. These gates 26, in the construction shown, when in closed or normal position, extend parallel with the groove 22, and are held normally in such closed position by the spring attached thereto.

At the point of juncture of the groove 24 and the groove 22 is located a swinging gate 27, which when closed extends parallel with the sides of the groove 24. The gate 27 located on the plate 16, and the gate 27' located on the plate 19, are each provided with a crank 28 and 29 respectively, which are joined together by a rod or bar 30, and each crank has associated therewith a spring 31, and the cranks are arranged so that the gates 27 and 27' are moved in reverse direction when the bar 30 is moved. These plates 16 and 19 reciprocate back and forth within their respective guides, in correspondence with the movement of the plunger of the baling mechanism, by means of the connection between the plunger and plates.

Arranged to travel in the grooves of the plate 16 is a roller 32 on a sliding member 33, which is in the nature of a shuttle, and arranged to travel in the grooves of the plate 19 is a roller 34 on a sliding member 35, also in the nature of a shuttle. These shuttles 33 and 35 constitute the wire feeding or advancing means, as will hereinafter appear.

To describe the method of travel of the rollers 32 and 34: Assuming the parts to be in the position shown in Fig. 1, as the plates 16 and 19 are advanced in the direction of the arrow in said figure, the rollers 32 and 34 will be deflected by the gates 27 and 27' so that they will pass into the grooves 25, and will therefore each be forced toward the center of the machine. This will, of course, advance the shuttles 33 and 35 toward said center. When the rollers have reached the grooves 23 they will have reached their limit of inward movement, and will remain in this inwardly advanced position while traveling in these grooves 23. The rollers will pass from the grooves 23 into the grooves 24, and while traveling in these grooves will be retracted toward the outside of the machine, thus retracting the shuttles 33 and 35 in correspondence therewith, from which it will be seen that the shuttles and plates are moving crosswise and at right angles to one another. The rollers will finally pass through the swinging gates 26 and into the outer grooves 22. These gates, by reason of the spring tension thereon, will, after the roller has passed therethrough, return to the closed position shown in Fig. 1, and on the return stroke the rollers will travel in the grooves 22, and will not pass into the grooves 24. When they reach the gates 27 and 27', each will respectively act to throw the gate over into a position so that it will aline with the groove 22, and owing to the arrangement of the cranks and springs, the gates will be held in this closed position until the operator moves them into the position shown in Fig. 1 by manipulation of the bar 30. Therefore, until this bar is manipulated, the plates 16 and 19 will reciprocate back and forth, with the rollers 32 and 34 traveling entirely within the grooves 22 of said plate, and no action will be exerted tending to move the shuttle 33 or 35 in or out. This, of course, is necessary, since several actions of the baling plunger must be permitted before the bale tying operation is instigated, and the operator can wait until a sufficient mass of hay has been accumulated in the baling channel or way to constitute a bale, when he will move the bar 30 to cause a deflection of rollers out of the grooves 22 and into the grooves 23, with a consequent actuation of the shuttles.

The shuttle 33 consists of a body 36 (see Fig. 2), terminating at its forward end in a neck 37, and said shuttle travels within guideways 38 and 39. The shuttle 35 consists of a body 40, terminating at its forward end in a neck 41, and said shuttle travels in guideways 42 and 43. Secured to the top of the neck 37, or formed integral therewith, is a lug 44, through which extends a pin 45 terminating in a member 46 formed with a beveled undercut recess, which member acts as a buffer or stop for the end of the shuttle 35, and suitable means are provided for adjusting the position of this member 46, as will be apparent from Fig. 2. The neck 37 terminates in a head 47 which has a beveled under face 48, and just to the rear of this head 47 is formed a groove 49, in which lies the wire 50 forming one portion of the bale tie, when said tie is being carried toward the center of the machine. This wire is caught midway its length by the shuttle 33, as will be seen from Fig. 3, and as the shuttle advances the wire is carried forward looped around the forward end of said shuttle with the loop portions in the groove 49, so that the wire lies at each side of the shuttle, as will be apparent from Figs. 2 and 11; and to the rear of the groove is mounted a cutting member 51 (see Figs. 4 and 8), the operation of which will be hereinafter described.

The neck 41 of the shuttle 35 is formed at its forward end with a head 54ª similar to the head 47, which head has a beveled upper face 53 similar to the beveled face 48. Just in back of this head is formed a groove 54 similar to the groove 50. The wire 55 forming the other wire of the bale tie is caught in this groove 54 midway its length, in the same manner as the wire 50 is caught in the groove 49, and is carried forward in a similar manner. The wire 50, when positioned in the groove 49, lies along shoulders 56 which extend rearwardly from each side of said groove, and passes into grooves 57 at the upper edge and at each side of the shuttle 33; the wire 55, when caught in the groove 54, passes beneath shoulders 58, which extend rearwardly from each side of said groove, and passes into grooves 59 on the lower face of the shuttle 35, so that when the shuttles 33 and 35 have reached their extreme outward movement, as shown in Fig. 8, the looped wire 50 and the looped wire 55 are carried across one another and in overlapping relation with the portion thereof lying in the grooves 59 and 57 in close proximity to one another, as will be apparent from Fig. 8.

As heretofore stated, the wire is fed forward by the shuttles 33 and 35, in the manner described, when sufficient hay has been accumulated within the hay passage to constitute a bale. When the wires have been advanced in the manner described, we have two loops of wire, one overlapping the other, and to constitute the bale ties, it is necessary to twist the adjacent portions of each loop wire and to sever the loop portions of the wire. The severance is accomplished by the cutting member 51, heretofore described, and a cutting member 60 (see Figs. 4 and 8) carried by the neck 41 of the shuttle 35. Each of these cutting members is normally held in cutting position by means of a spring 61. The means for twisting the adjacent portion of the loop section of wire, in the construction shown, is carried by the shuttle 35.

In the operation of these machines, it is desirable to form two ties or wraps of wire, one adjacent to the upper end of the bale, and the other adjacent to the lower end. For that reason the bale tying machine as constructed is arranged to simultaneously place two wires. The mechanism for placing the lower wire is exactly similar to the mechanism for placing the upper wire, which latter has previously been described; and the lower mechanism consists of a shuttle 62 similar to the shuttle 33, and which is joined to said latter shuttle by a connecting piece 63ª. The shuttle 62 terminates in a head 63 similar to the head 47 of the shuttle 33, and advances a wire 64 in the same manner as the wire 50 is advanced, and it is held in place on said head by grooves and shoulders similar to those described in connection with the head 47. A shuttle 65 is provided in said lower mechanism, similar to the shuttle 35, which shuttle 65 terminates in a head 66 similar to the head 63, and which carries and advances a wire 67, similar to the manner in which the wire 55 is advanced, so that there are shown duplicate mechanisms tied together for overlapping looped wires at both the upper and lower portions of the bale, after the bale has been completed. The shuttle 62 carries a cutting member 68, and the shuttle 65 carries a cutting member 69, which are similar to the cutting members 51 and 60 previously described. The shuttles 35 and 65 are joined together by a connecting piece 70. The shuttles 33 and 62, being tied together, are moved in unison by the travel of the roller 32 within the grooves of the plate 16; and the shuttles 35 and 65, being tied together, are moved in unison by the travel of the roller 34 in the grooves of the plate 19. I will state at this point that the shuttle 35 also carries a buffer or stop member 74 similar to the buffer or stop member 46 described in connection with the shuttle 33, and that the shuttle 65 carries a buffer or stop member 75; and the shuttle 62 a buffer or stop member 76. These stop members are provided so that the movement of the shuttles 33 and 35, 62 and 65, will be brought to a stop without an undue jolt or strain upon the mechanisms, and, moreover, to insure proper alinement of the parts for the twisting operation.

Mounted upon and carried by the shuttle 35 is a shaft 71, which on its rear end carries a pinion 72, and this pinion, when the shuttle 35 is in its advanced position shown in Fig. 4, alines and meshes with a rack 73 carried on the under face of the plate 19, and located, as will be seen from Fig. 1, adjacent to the center of the inner groove 23 on the under side of this plate. The rack 73, as stated, is carried on the under side of the plate 19, and as this plate is actuated, the rack will operate to turn the pinion 72, rotating the shaft 71. The movement of the pinion 72 also rotates a gear 77, which is carried by a stub shaft 78 mounted on the connecting piece 70, and this gear 77 meshes with a pinion 79, mounted on a shaft 80 carried by the shuttle 65, the shafts 71 and 80 being of similar formation.

A brake mechanism, consisting of a spring-pressed pin 81, is provided, which pin bears against a collar 82 on the end of the shaft 71, and prevents accidental movement of this shaft and the pinion 72, and also eliminates the possibility of overthrow of the shaft. A brake member, consisting of a spring-pressed pin 83, bears against a collar 84 on the end of the shaft 80, to prevent overthrow of this shaft. Adjacent to the forward ends of each of the shuttles 35 and 65 is a coiling mechanism, the construction of each of which is exactly similar to that of the other, and, therefore, detailed explanation of only one will be given. The coiling mechanisms each consist of a center gear 85, meshing with which are pinions 86 and 87 lying on opposite sides thereof (see Figs. 6 and 7); and in describing this coiling mechanism, reference will be made to that associated with the shuttle 35, although it is understood that a similar mechanism is associated with the shuttle 65. This gear 85 is driven by the rotative movement of the shaft 71. The pinion 86 is provided with a curvilinear slot 88, and the pinion 87 is provided with a curvilinear slot 89. It is to be noted at this point that the body of the shuttle is formed with an opening 90, and the shuttle 33 is cut away to provide an opening 91, to allow of the operation of the wire twisting mechanism. The shuttle 65 is cut away as at 92, and the shuttle 62 as at 93, to form openings similar to the openings 90 and 91.

The wire coiling mechanism is more particularly shown in Figs. 6 and 7, and reference should, therefore, be had to these figures in an ensuing description of this mechanism. The pinion 86 is carried by a frame 94, which is mounted to swing on the shaft 71, as will be understood from Fig. 2. This frame, which extends to each side of the pinion, as will be seen from Fig. 2, has extending therefrom a knob or button 95, which is engaged by a pivoted lever member 96. This lever member is mounted to swing on a shaft 97, and terminates at one end in a forked end 98 which engages the stud or button 95, and at its opposite end in a forked end 99 which engages a stud or button 100, which latter is secured to a hub 101, from which extends a frame 102 carrying the pinion 87. This frame 102 is in all material respects similar to the frame 94, and is mounted to swing upon the shaft 71. The only difference between the two frames is that the frame 102 is somewhat larger than the frame 94, the reason for which will be obvious from an inspection of Fig. 2. The shaft 97 is actuated with a rocking movement, by suitable means which will be hereinafter described, and when rocked moves the lever 96 in correspondence. Assuming the movement to be in the direction of the arrow in Fig. 6, the lever will be moved from the position shown in Fig. 6 to the position shown in Fig. 7, forcing the frame 94 and the frame 102 both downward, as will be clearly understood by reference to these figures, and thereby moving the pinions 86 and 87 downward, and when so moved downward, the wires which are to be twisted together will lie in the upper portion of the slots 88 and 89 of the pinions 86 and 87, respectively, as will be seen from Fig. 7. Then to complete the twisting operation, all that is necessary is a rotative movement of the gear 85 to rotate the pinions 86 and 87, which is brought about, as previously explained, by the actuation of the rack 73, in turning the shaft 71.

I will now describe the means for moving the coilers or twisters into and out of operative position with respect to the wires: The movement into operative position takes place prior to the twisting operation, and the movement out of operative position takes place after the completion of the twisting operation, and these movements are produced by a cam faced member 103, which is joined to the plate 19, and is clearly shown in Fig. 5. This cam faced member engages a roller 104 on the top of a shiftable bar 105, extending from which is a link 106 and a link 107, the link 106 being joined to the shaft 97, and the link 107 being joined to a similar shaft on the lower tie forming mechanism. It is obvious that as this cam member 103 passes over the roller 104, it will first depress said roller to rock the shaft 97, and move the lever member 96 to swing the frames 94 and 102 to lower position, moving the coiling members 86 and 87 to lowered or acting position, as shown in Fig. 7, and while traveling along the lower face of the cam member, the roller 104 will remain depressed, holding said coiling members in lowered position, during which time the rack 73 will operate to rotate the coilers through the instrumentalities of the gear 85; and when this operation is completed, the roller will have reached one of the inclined surfaces of the cam 103, and will rise, producing the lifting action of the coiling members, through the action of the bar 105, links 106 and 107, shaft 97, frames 94 and 102. As stated, the coiling members are lowered prior to the rotative movement of the same, and lifted after the completion of said rotative movement, and the cam 103 is arranged to carry out this method of operation, as will be seen from Fig. 5. At the completion of the coiling operation previously described, the wires remain coiled together in two coils 108 and 109, as in Fig. 12. When this has been done, the rollers 32 and 34 will have reached the grooves 24 on the plates 16 and 19 respectively, and the shuttles 33, 35, 62 and 65 will be moved in an outward direction and away from one another. As this movement takes place, the cutting members 51, 60, 68 and 69 will act to sever the loop portions of the wire, as at 110, (see Fig. 12), thereby forming the rear end of one bale tie and the forward end of the next bale tie. In order to perform the twisting operation, it is necessary that the wires advance outwardly with the wire shuttles, in a straight line, or they will not be in proper position to be engaged by the twisting members. I, therefore, provide pins 111, 112, 113 and 114 to guide the wires in their outward movement and insure their remaining in proper position upon the shuttles to be engaged by the twisters. The guide members 111 and 113 are stationary, while the guide members 112 and 114 are movable, being actuated by cam members 115 attached to the under sides of the various shuttles, these cam members being clearly shown in Fig. 4. The guide members 112 and 114, which are in the shape of sliding pins, are held normally downward by a suitable spring 116. Of course, it is necessary to have all of the wire guide members lie in front of the wire, otherwise their function as a guiding means for forcing the wire in straight lines outwardly would be nullified, and it is for the purpose of keeping them in this position that the pins 112 and 114 are made movable.

By referring to Fig. 3, it will be seen that the bale advances through the machine inside of all the wire guides. If, however, the guides 112 and 114 are made stationary, the wire, as it is carried along by the bale, will pass to the front of the pins 112 and 114, instead of to the rear, because of the fact that the bale is located inside of these guides. By making the pins 112 and 114 movable, and by properly arranging the cams 115, these pins will be dropped while the bale is being advanced, and will not be raised until the shuttles again start their forward movement. By lowering the pins 112 and 114 during the bale advancing process, the wire will be carried forward by the bale, and by coöperation of the sides of the bale passage or way 117 and the guides 111 and 113, the wire will be stretched into a diagonal position, as will be seen from Fig. 3, and when so placed, if the guide members 112 and 114 are raised, as they will be by the cam members 115 when the shuttles are advanced, these pins will assume a position in front of the wires, and perform their guiding function as was intended.

The operation of the machine is as follows: The free ends of the wires, extending from opposite sides of the machine, are first passed around the guides 111 and 113, and connected together manually at the center of the machine. The rod or bar 30 is then thrown so as to swing the gates 27 and 27ª into a position of parallelism with the grooves 22, and, the gates 26 being held by spring tension in a condition of parallelism with this groove, the baling plunger is started and reciprocates back and forth, pressing the hay into and through the bale guide or way 117 to the end thereof. As the hay advances, the forward end of the bale will strike the joined end of the wires, and the wires will be carried forward with the bale. During this operation, the entrances to the grooves 24 and 25 being closed by the position of the gates 26, 27 and 27', no movement of any of the shuttles will be produced, and the baling operation alone will be performed. After a sufficient quantity of hay has been packed into the baling channel to produce a bale, the operator throws the bar 30 to swing the gates 27 and 27' into the position shown in Fig. 1. Then upon the next operation of the baling plunger, which plunger also actuates the plates 16 and 19, the rollers 32 and 34 will advance in the grooves 25, forcing the shuttles 33, 35, 62 and 65 toward the center of the machine, and carrying a loop from each of the wires forward and into overlapping position, as shown in Figs. 2, 8 and 11. In this position, one portion 118 of the wires will be lying to the rear in the completed bale, and the other portion 119 of the wires will be lying in front of the next to-be-formed bale. When the wires are in this position, the cam 103 will engage the roller 104, depressing this roller, moving the bar 105 downward, swinging the links 106 and 107, rocking the shafts 97 of both the upper and lower twisting mechanisms, moving the frames 94 and 102 of the pinions 86 and 87 respectively downward, through the instrumentality of the lever 96, and bringing the wires within the grooves of said pinions. When this has been brought about, the rack 73 will engage the pinion 72, rotating the shafts 71 and 80, rotating the gears 85 of both the upper and lower twisting mechanisms, which imparts a rotative movement to the coiling pinions 86 and 87, placing a coil or twist in the wires. When this action is complete, the roller 104 will engage a sloping portion of the cam 103, allowing the roller to rise again, which will move the coilers out of coiling position, and into the position shown in Fig. 6, and then immediately afterward the rollers 32 and 34 will enter the grooves 25, retracting the wire carrying members 33, 35, 62 and 65, and during such retraction the cutting members 51, 60, 68 and 69 will act to sever the wire, as in Fig. 12, and the bale tie forming operation will be complete. As the rollers 32 and 34 pass through the gates 26, these gates will close by action of the springs attached thereto, and the rollers will then be in the grooves 22, and on the next movement of the plates 16 and 19, by the actuation of the baling plunger, the rollers will strike the gates 27 and 27', forcing them into closed position, that is, parallel with the grooves 22, so that the rollers will continue to travel in the grooves 22 until the bar 30 is again actuated to move the gates 27 and 27' into the position shown in Fig. 1. By severing the wire in the manner indicated, the portion 118 of the wires will remain with the previously formed bale, while the portion 119 of the wires will be engaged by the advancing bale, and will be carried forward with such bale so as to constitute the forward portion of the bale tie for this bale. The operation of tying the bale will then be repeated as above.

The entire machine is, of course, capable of modification, and the invention is not intended to be limited by the construction shown and described, but is defined and expressed by the terms of the appended claims.

I claim:

1. In a machine of the class described, the combination of a baling plunger, shuttle members arranged on opposite sides of the machine for carrying wires forward into overlapping relation with one another and in looped formation, reciprocating means operated by the baling plunger and operatively connected to said shuttles, means for joining the overlapped portions of the wires together, means for severing the looped portions of the wires, and means operatively connected for actuating said joining and severing mechanisms, substantially as described.

2. In a machine of the class described, the combination of a baling plunger, shuttles arranged on opposite sides of the machine for carrying the wire forward into overlapping relation, a reciprocating member actuated by the baling plunger, an operative connection between the shuttles and reciprocating member, means for twisting the overlapping portions of the wires, and means operatively connected for actuating said twisting mechanism, substantially as described.

3. In a machine of the class described, the combination of reciprocating shuttle members located on opposite sides of the machine, said shuttles advancing the wires from opposite sides of the machine in looped formation and into overlapping relation, means for joining together the overlapped portions of the wires, means for severing the looped portions, and means operable with a reciprocating movement and at right angles to the line of movement of said shuttles for actuating said shuttles, joining mechanism and severing mechanism, substantially as described.

4. In a machine of the class described, the combination of reciprocating shuttles arranged on opposite sides of the machine, said shuttles advancing wires into overlapping relation, means for joining the overlapped portions of the wires together, and means operable with a reciprocating movement and at right angles to the movement of the shuttles for actuating said shuttles and joining mechanism, substantially as described.

5. In a machine of the class described, the combination of means for advancing wires from opposite sides of the machine and into overlapping relation, means for joining the overlapped portions of said wires together, a reciprocating member, means operatively connected for reciprocating said member, a cam trackway on said member, and a roller on said wire advancing means arranged to travel in said trackway, substantially as described.

6. In a machine of the class described, the combination of means for advancing wires from opposite sides of the machine into overlapping relation and in looped formation, a reciprocating member, means operatively connected for reciprocating said member, a cam trackway on said member, a roller on said wire advancing means arranged to travel in said trackway, means for joining the overlapped portions of the wires together, and means for severing the looped portions of the wire, substantially as described.

7. In a machine of the class described, the combination of means for advancing wires from opposite sides of the machine and into overlapping relation, means for joining the overlapped portions of said wires together, a reciprocating member, means operatively connected for reciprocating said member, a cam trackway on said member, a roller on said wire advancing means arranged to travel in said trackway, and means carried by said reciprocating member for actuating said joining mechanisms, substantially as described.

8. In a machine of the class described, the combination of means for advancing wires from opposite sides of the machine into overlapping relation and in looped formation, a reciprocating member, means operatively connected for reciprocating said member, a cam trackway on said member, a roller on said wire advancing means arranged to travel in said trackway, means for joining the overlapped portions of the wire together, means for severing the looped portions of the wire, and means carried by said reciprocating member for actuating said joining and severing means, substantially as described.

9. In a machine of the class described, the combination of means for advancing wires from opposite sides of the machine into overlapping relation and in looped formation, a reciprocating plate, means operatively connected for reciprocating said plate, a cam trackway on said plate, a roller on said wire advancing means arranged to travel in said trackway, means for joining the overlapped portions of the wire together, means for severing the looped portions of the wire, and means for controlling the entrance of said roller into said trackway, substantially as described.

10. In a machine of the class described, the combination of means for advancing wires from opposite sides of the machine into overlapping relation, means for joining the overlapped portions of said wires together, a reciprocating plate, means operatively connected for reciprocating said plate, a cam trackway on said plate, a roller on said wire advancing means arranged to travel in said trackway, means carried by said plate for actuating said joining mechanism, and means for controlling the entrance of said roller into said trackway, substantially as described.

11. In a machine of the class described, the combination of means for advancing wires from opposite sides of the machine into overlapping relation, means for joining the overlapped portion of said wires together, a reciprocating plate, means operatively connected for reciprocating said plate, a cam trackway on said plate, a roller on said wire advancing means arranged to travel in said trackway, and a shiftable member for controlling the entrance of the rollers into said trackway, substantially as described.

12. In a machine of the class described, the combination of means for advancing wires from opposite sides of the machine into overlapping relation, means for joining the overlapped portions of said wires together, a reciprocating plate, means operatively connected for reciprocating said plate, a cam trackway on said plate, a roller on said wire advancing means arranged to travel in said trackway, a series of gates arranged to control the entrance of said roller into the trackway, and means for actuating said gates, substantially as described.

13. In a machine of the class described, the combination of means for advancing wires from opposite sides of the machine into overlapping relation, means for joining the overlapped portions of said wires together, a reciprocating plate, means operatively connected for reciprocating said plate, a cam trackway on said plate, a roller on said wire advancing means arranged to travel in said trackway, a series of gates arranged to control the entrance of the rollers into the trackway, and a shiftable member for actuating said gates, substantially as described.

14. In a machine of the class described, the combination of shuttles for advancing wires from opposite sides of the machine into overlapping relation, said shuttles comprising a body portion terminating in a head and formed with a groove adjacent to said head and arranged to receive the wire and advance it in looped formation and means operatively connected for actuating said shuttle, substantially as described.

15. In a machine of the class described, the combination of shuttles for advancing wires from opposite sides of the machine into overlapping relation, said shuttles comprising a body portion terminating in a head and formed with a groove adjacent to said head and arranged to receive the wire and advance it in looped formation, means operatively connected for actuating said shuttles, and means for arresting the inward movement of the shuttles, substantially as described.

16. In a machine of the class described, the combination of shuttles arranged upon opposite sides of the machine for advancing wires into overlapping relation with one another, said shuttles being arranged to travel one above the other, a groove in the upper shuttle for bringing the wire carried thereby along the lower side of said shuttle, a groove on the lower shuttle for bringing the wire carried thereby to the upper portion of this shuttle, means for joining the overlapping portions of the wires together, and means for actuating said shuttles, substantially as described.

17. In a machine of the class described, the combination of shuttles for advancing wires into overlapping relation and in looped formation, means for joining the overlapped portions of the wires together, means for severing the looped portion of the wire, means for actuating said wire advancing, joining and severing means, means for guiding the wires in their travel outward with the advancing means comprising members on each side of each shuttle, one of said members associated with each of said shuttles being movable, and means for depressing and raising said movable members in correspondence with the movements of the wire advancing means, substantially as described.

18. In a machine of the class described, the combination of shuttles for advancing wires into overlapping relation and in looped formation, means for joining the overlapped portions of the wires together, means for severing the looped portions of the wires, means for actuating said wire advancing, joining and severing means, means for guiding the wires in their travel outward with the advancing means, comprising members on each side of each shuttle, one of said members associated with each of said shuttles being movable, and a cam member carried by the wire advancing means, for raising and lowering said movable members, substantially as described.

19. In a machine of the class described, the combination of means for advancing wires from opposite sides of the machine into overlapping relation, means for actuating said wire advancing means, means for twisting the overlapped portions of said wires together carried by said wire advancing means, said twisting means comprising slotted twisters, means for raising and lowering said twisters to bring them into and out of operative relation with said wires, means for rotating said twisters to effect the twisting operation, and means for actuating said twister rotating and twister raising and lowering means in correspondence with the movement of the wire advancing means, substantially as described.

20. In a machine of the class described, the combination of means for advancing wires from opposite sides of the machine into overlapping relation, means carried by the wire advancing means for twisting the overlapped portions of the wires, said twisting means consisting of slotted twisting members, a movable frame carrying each twisting member, means operatively connected for moving said frames to raise and lower said frames to carry the twisting members into and out of operative position, and means for rotating the twisting members, substantially as described.

21. In a machine of the class described, the combination of means for advancing wires from opposite sides of the machine into overlapped relation, means carried by the wire advancing means for twisting the overlapped portions of the wires together, said twisting means comprising slotted twisting members, a movable frame carrying each twisting member, a lever member for moving said frames to carry the twisting members into and out of operative position, means for actuating said lever member, and means for rotating said twisters, substantially as described.

22. In a machine of the class described, the combination of means for advancing wires from opposite sides of the machine into overlapping relation, means for twisting the overlapped portions of the wires, comprising oppositely disposed swinging twisting members, means for swinging said twisting members into and out of operative position, means for actuating said swinging means in conformity with the movements of the wire advancing means, and means for rotating the twisting members, substantially as described.

23. In a machine of the class described, the combination of a baling plunger, a movable member operated in harmony with the baling plunger, means for advancing wires from opposite sides of the machine into overlapping relation, means operatively connected for actuating said advancing means, means for twisting the overlapped portions of the wires together, comprising oppositely disposed shiftable twisting members, means for shifting said members into and out of operative position, means for rotating said members to effect the twisting operation, and said shifting means and operating means being actuated by the movements of said movable member, substantially as described.

24. In a machine of the class described, the combination of means for advancing wires from opposite sides of the machine into overlapping relation, means for twisting the overlapped portions of the wires together, a main actuating member, a connection between said actuating member and wire advancing means, a rack on said actuating member for rotating said twisting means, and a cam on said actuating member for moving said twisting means into and out of operative position, substantially as described.

25. In a machine of the class described, the combination of reciprocating shuttle means located on opposite sides of the machine, said shuttles advancing the wires from opposite sides of the machine in looped formation and into overlapping relation, means for joining together the overlapped portions of the wires, means for severing the looped portions, and means for actuating said shuttles, joining mechanism, and severing mechanism, substantially as described.

26. In a machine of the class described, the combination of reciprocating shuttles arranged on opposite sides of the machine, said shuttles advancing wires into overlapping relation, means for joining together the overlapped portions of the wires, and means for actuating said shuttles and joining mechanism, substantially as described.

WALTER F. MOTTIER.

Witnesses:
 Guy W. Merritt,
 W. A. Davidson.